(12) United States Patent
Cronin et al.

(10) Patent No.: US 7,117,198 B1
(45) Date of Patent: Oct. 3, 2006

(54) METHOD OF RESEARCHING AND ANALYZING INFORMATION CONTAINED IN A DATABASE

(75) Inventors: John Edward Cronin, Milton, VT (US); Yu Wang Bibby, St. Albans, VT (US)

(73) Assignee: ip Capital Group, Inc., Williston, VT (US)

( * ) Notice: Subject to any disclaimer, the term of this patent is extended or adjusted under 35 U.S.C. 154(b) by 544 days.

(21) Appl. No.: 09/723,960

(22) Filed: Nov. 28, 2000

(51) Int. Cl.
*G06F 17/00* (2006.01)

(52) U.S. Cl. ........................................................ 707/3

(58) Field of Classification Search .............. 707/1–10, 707/100–102, 104.1, 200, 201, 203; 704/1, 704/2, 7, 9; 709/200, 217–219; 715/500, 715/503, 505, 513, 530, 531, 700, 961, 965, 715/966, 968; 345/418, 440, 700, 961, 965, 345/966, 968

See application file for complete search history.

(56) References Cited

U.S. PATENT DOCUMENTS

| | | | |
|---|---|---|---|
| 4,674,066 A | | 6/1987 | Kucera |
| 5,400,086 A * | | 3/1995 | Sano et al. .................. 348/678 |
| 5,761,493 A * | | 6/1998 | Blakeley et al. ................ 707/4 |
| 5,765,138 A * | | 6/1998 | Aycock et al. .................. 705/7 |
| 5,806,056 A * | | 9/1998 | Hekmatpour ................. 706/50 |
| 5,835,758 A * | | 11/1998 | Nochur et al. .............. 707/102 |
| 5,852,819 A | | 12/1998 | Beller |
| 5,855,008 A * | | 12/1998 | Goldhaber et al. ............ 705/14 |
| 5,873,056 A * | | 2/1999 | Liddy et al. ..................... 704/9 |
| 5,930,474 A * | | 7/1999 | Dunworth et al. .......... 709/217 |
| 6,035,295 A | | 3/2000 | Klein |
| 6,038,561 A | | 3/2000 | Snyder et al. |
| 6,041,326 A * | | 3/2000 | Amro et al. ................... 707/10 |
| 6,078,917 A * | | 6/2000 | Paulsen et al. ................. 707/6 |
| 6,088,717 A * | | 7/2000 | Reed et al. .................. 709/201 |
| 6,108,663 A * | | 8/2000 | Kableshkov ................ 707/102 |
| 6,154,720 A * | | 11/2000 | Onishi et al. ................... 704/2 |
| 6,175,824 B1 | | 1/2001 | Breitzman et al. |
| 6,209,004 B1 | | 3/2001 | Taylor |
| 6,298,327 B1 * | | 10/2001 | Hunter et al. .................. 705/1 |
| 6,311,176 B1 * | | 10/2001 | Steiner ........................ 706/45 |
| 6,424,429 B1 * | | 7/2002 | Takahashi et al. ......... 358/1.16 |
| 6,438,590 B1 * | | 8/2002 | Gartner et al. .............. 709/219 |
| 6,457,009 B1 * | | 9/2002 | Bollay .......................... 707/10 |
| 6,463,430 B1 * | | 10/2002 | Brady et al. .................... 707/3 |
| 6,499,026 B1 * | | 12/2002 | Rivette et al. .................. 707/2 |
| 6,618,709 B1 * | | 9/2003 | Sneeringer .................. 705/412 |
| 6,728,693 B1 * | | 4/2004 | Lautzenheiser et al. ........ 707/1 |
| 6,728,752 B1 * | | 4/2004 | Chen et al. ................. 709/203 |

* cited by examiner

*Primary Examiner*—Greta Robinson
*Assistant Examiner*—Harold E. Dodds, Jr.
(74) *Attorney, Agent, or Firm*—Downs, Rachlin & Martin

(57) ABSTRACT

A method (100) of researching and analyzing information contained in documents that belong to a first database (200) and are organized according to a first set of fields (210) for an electronic search and retrieval by a computer (850). The method includes the steps of: a) conducting an electronic search (202) of the first database to retrieve at least one document; b) developing user-defined fields (300); c) reading (310) the at least one document to retrieve information pertaining to the user-defined fields; d) entering into a second database (510) the at least one document, values of the first set of fields for the at least one document, the user-defined fields and the retrieved information pertaining to the user-defined fields; and e) analyzing (506) the information contained in the second database.

43 Claims, 42 Drawing Sheets

| Core Competency | Description | Weight Factor |
|---|---|---|
| Organic chemist | | 7 |
| | | |
| Chemical engineer | | 5 |
| Biochemist | | 5 |
| Toxicologist | | 3 |
| | | |
| Physical chemist | | 5 |
| Analytical chemist | | 5 |
| | | |
| | | |
| Medical Doctor | | 5 |

FIG. 4

| Technology | Description | Weight |
|---|---|---|
| Organic chemistry | synthesis | 7 |
| Analytical chemistry | development method | 3 |
| Manufacturing processes | | 3 |
| Animal studies | testing of drugs on animals | 3 |
| | | |
| | | |
| | | |
| | | |

FIG. 5

| Element | Description | Weight Factor |
|---|---|---|
| Chemical formulation | | 7 |
| | | |
| | | |
| use friendly package | | 5 |
| | | |
| | | |
| Patient reaction | | 7 |
| | | |
| | | |
| | | |
| | | |
| | | |
| | | |
| | | |

FIG. 6

| Business Driver | Weight Factor |
|---|---|
| Market response | 7 |
| User convenience | 10 |
| new treatment | 5 |

FIG. 7

| Product Category | Description of the major products in each category | Weight Factor |
|---|---|---|
| estrogen | | 5 |
| disease treatment | | 7 |
| drug prevention | | 3 |
| calcitonin | | 3 |
| estrogen inhibitors | | 5 |

FIG. 8

| Field of Invention | Description of Fields | Weight Factor |
|---|---|---|
| synthetic chemistry | | 3 |
| formulation | | 5 |
| | | |
| | | |
| | | |
| method of use | | 7 |
| | | |

FIG. 9

| Problems: How to...? | Weight Factor |
|---|---|
| improve bioavailability | 7 |
| improve drug acceptance | 7 |
| | |
| | |
| | |
| improve drug efficacy | 9 |
| | |

FIG. 10

| IP Strategies | Description of all Technologies | Weight Factor |
|---|---|---|
| Patent Around | combination of products | 7 |
| Publish In Front Of | tabletting, chemical formulation | 4 |
| Publish Around | | |
| Need To Understand More | | |
| Not In area of Interest | Method of use | 1 |

FIG. 11

| Priority | Technologies or Products |
|---|---|
| Emergency | once weekly dosing |
| High | direct compression formulation, coated tablet |
| Medium | organic synthesis |
| Low | |

FIG. 12

| Invention View | Description of Technologies or Products |
|---|---|
| User's Capability | tabletting, coating, packaging |
| Supplier's Capability | analytical chemistry |
| Competitors' Capability | |

FIG. 13

| Applied Invention Matrix | Description of Technologies or Products |
|---|---|
| Breakthrough | method of use |
| Distinctive | coating, tabletting |
| Incremental | |

FIG. 14

| Market Size | Description of Technologies or Products |
|---|---|
| $1M-10M | |
| $10M-100M | |
| $100M-1B | |
| $1B-5B | coating, combination products |
| Greater than $5B | synthetic chemistry, formulation, tabletting, method of use |

FIG. 15

| Maturity of Technology | Description of Technologies or Products | Weight Factor |
|---|---|---|
| Last Generation | synthetic chemistry, tabletting, | 5 |
| Current Generation | coating, | 3 |
| Emerging Generation | chemical formulation, packaging, method of use, combination products | 7 |

FIG. 16

| Importance of Product | Description of Technologies or Products |
|---|---|
| Peripheral | tabletting, |
| Element of a Product | formulation, coating, packaging |
| Essential to a Product | method of use |
| Creates a Product | synthetic chemistry, combination of products |

FIG. 17

| Patent Strategy | Description of Technologies or Products |
|---|---|
| No Patent Strategy for this Invention field | calcitonin |
| High | disease treatment, drug prevention, estrogen inhibitors |
| Medium | estrogen, |
| Low | analytical method |

FIG. 18

| Business Strategy | Description of Technologies or Products |
|---|---|
| No Business Strategy For Field Of This Invention | formulation, tabletting |
| High | synthetic chemistry |
| Medium | method of use, combination of products |
| Low | tabletting, coating, packaging |

FIG. 19

| Detection | Description of Technologies or Products |
|---|---|
| Obvious | coating, tabletting, packaging, method of use, combination products |
| Easily Detected | |
| Detectable With Work | synthetic chemistry, formulation |
| Undetectable | |

FIG. 20

| Competitors Use | Description of Technologies or Products |
|---|---|
| Less than 10% of Competitors will use | |
| 10-50% of Competitors will use | synthetic chemistry, formulation, method of use, combination products |
| Most Competitors will use | tabletting, coating, packaging, |
| Unknown | |
| | |
| Will only be used by our Company | |

FIG. 21

| Suppliers use | Description of Technologies or Products |
|---|---|
| Less than 10% of Suppliers will use | tabletting, coating, packaging, formulation, method of use, combination products |
| 10-50% of Suppliers will use | |
| Most Suppliers will use | synthetic chemistry |
| Unknown | |

FIG. 22

| Customer Use | Description of Technologies or Products |
|---|---|
| No Customers will use | tabletting, coating, formulation, synthetic chemistry, packaging, method of use, combination products |
| Less than 10% of Customers will use | |
| 10-50% of Customers will use | synthetic chemistry |
| Most of Customers will use | |

FIG. 23

| Alliance Potential | Description of Technologies or Products |
|---|---|
| Low | tabletting, |
| Medium | packaging, formulation |
| High | synthetic chemistry, coating, method of use, combination products |
| Unknown | |

FIG. 24

| Tech Transfer Potential | Description of Technologies or Products |
|---|---|
| Low | tabletting, coating |
| Medium | formulation, packaging |
| High | synthetic chemistry, method of use, combination products |
| Unknown | |

FIG. 25

| Prestige | Description of Technologies or Products |
|---|---|
| Low | tabletting, formulation |
| Medium | synthetic chemistry, coating, packaging |
| High | method of use, combination products |

FIG. 26

Step One: Main Categories                             560
To create the HLA framework, the products or technology must first be separated into general categories. For example, a computer system might be separated into the general categories of the processor, the monitor and input devices.

Step Two: Sub-Category 1                             562
Next, separate the general categories into sub-categories. For example, the processor might be separated into the motherboard, the graphics board and the disk drives.

Step Three: Sub-Category 2                            564
Next, if possible, separate each sub-category 1 entry into another level of sub-categories. For example, the motherboard might be separated into the CPU and the cache.

Step Four: Add to Spreadsheet                          566
Finally, add this information to the spreadsheet by double clicking the icon below. Place the main categories in the "HLA – Main" column, the first sub-categories in the "Sub-Category 1" column, and the second sub-categories in the "Sub-Category 2" column.

FIG. 27

Product: Computer 420

| HLA - Main | HLA - Sub-Category 1 | HLA - Sub-Category 2 |
|---|---|---|
| Processor 422 | Mother Board 428 | CPU 440 |
| Processor 422 | Mother Board 428 | Cache 442 |
| Processor 422 | Mother Board 428 | Ports 444 |
| Processor 422 | Graphics Board 430 | |
| Processor 422 | Disk Drives 432 | |
| Monitor 424 | Screen 434 | |
| Input Devices 426 | Mouse 436 | Buttons 446 |
| Input Devices 426 | Keyboard 438 | |

| Standard Patent Fields |
|---|
| Patent No. |
| Assignee |
| Year |
| Application date |
| Inventor |
| Class |
| Sub Class |
| IPC |
| Number of Claims |
| Number of Independent Claims |
| Number of Citations |
| Number of Content terms in first claim |
| Number of content terms in exemplary claim |
| Field 16 |
| Title |
| Field 18 |

FIG. 40

| User Field | Definition |
|---|---|
| Core Competencies | Skills and background needed to produce the invention or field of interest |
| Technologies | Principal technologies utilized in developing the invention or field of invention(FOI) |
| Elements | Principal elements (components) used to produce the invention or FOI |
| | for apparatus are actual elements |
| | for methods are steps |
| Business Drivers | Commercial advantages of the invention. |
| | e.g., higher yield, reduced cost, improved uniformity, reduced size |
| Products | Products / methods / processes produced by the invention |
| | e.g., electrodes, market forecast... |
| Field of the invention | Fields of the invention. e.g, etching, data compression, etc... |
| Problems | Major technical problems that the invention solves; how to... |
| | e.g. resist corrosion, compress data, etc. |
| IP Strategy | Categorize the technology or product of the invention by the possibility of use against competitor's patents. |
| Priorities | Prioritize the importance of each technology or product for a company. |
| Invention view | Capabilities a company needs to have to produce the product of the invention. |
| AIM | Categorize the level of novelty of the invention according to breakthrough, distinctive, incremental |
| Market size | Market size for the product or FOI. |
| Maturity of Technologies | Estimation of the maturity of the invention . |
| Importance of Products | Importance of products or FOI to current or other planed products. |
| Patent strategy | Importance of the technologies or products to your patent strategies. |
| Business Strategy | Importance of the invention to the business strategy. |
| Detectability | Categorize FOI by the ability to detect their use by others. |
| Competitive use | Percentage of competition who would use the invention. |
| Supplier use | Percentage of suppliers who would use the invention. |
| Customer use | Percentage of Customers who would use the invention. |

FIG. 41

| Columns 660 |
|---|
| Patent No. |
| Assignees |
| Year |
| Application date |
| Inventors |
| Class |
| Current Sub Class |
| IPC |
| Number of Claims |
| Number of Independent Claims |
| Number of Citations |
| Number of Citations not from applicant |
| Number of Content terms in first claim |
| Number of content terms in exemplary claim |
| Field 16 |
| Title |
| Field 18 |

Standard Patent Fields
651

| Columns 660 |
|---|
| Technology |
| Product |
| Invention View |
| Date |
| Note (field of the invention) |
| Value |
| License Out |
| IP Type |
| Idea |
| Priority |
| Area |
| Priority date |
| Inventor 2 |
| Inventor 3 |
| Inventor 4 |
| Cluster |
| Cluster |
| Cluster Name |
| Invention Type (Method or Apparatus...) |
| AIM Class |
| Core Competency |
| Business Drivers |
| Field of Invention |
| Problems |
| HLA (High Level Abstraction) |
| HLA Category Level 1 |
| HLA Category Level 2 |
| HLA Cluster Group |
| Group |
| Market Size |
| Maturity of Technology |
| Importance to Products |
| Patent Strategy |
| Business Strategy |
| Scope of Claims |
| Detectability |
| Avoidance |
| Competitive Use |
| Supplier Use |
| Customer Use |
| Alliance Potential |
| Technology Transfer |
| Prestige |
| Patent ID |
| Patent HTML |
| Initials (reader) |
| Count |

User-defined Fields
300

METHOD OF RESEARCHING AND ANALYZING INFORMATION CONTAINED IN A DATABASE

FIELD OF THE INVENTION

The present invention relates to a method of researching and analyzing information contained in databases and more particularly to information contained in electronic databases accessible over the Internet.

BACKGROUND OF THE INVENTION

A large number of databases are available in the public domain that are accessible over the Internet and contain a plethora of information. A database is defined as a collection of data organized especially for rapid search and retrieval as by a computer. The data may be text documents and/or images or numbers.

One example of a database is the patent database displayed in the United States Patent and Trademark Office (USPTO) web page. A provider, in this case the USPTO organization, provides and displays documents (i.e., patents) in the database and defines a method of searching the database using standard patent fields, i.e., patent number, inventor, assignee, issue date and title, among others. A user may also search the database by entering a search query consisting of specific keywords encoded in a Boolean formalism. The result of the database search is a list of documents that contain the standard patent fields or the keywords the user requested.

However, in many cases a user searches for specific type of information which although it may be contained in the database documents it cannot be directly accessed using the conventional search methods because the specific search query was not envisioned by the provider or was not intended to be searched. These specific types of search queries require advanced search methods and are used in research applications.

One such advanced search method is described in U.S. Pat. No. 6,038,561, where a dynamic concept (or "natural language") query is performed. A user enters a list of words ranging from a single keyword to an entire document in a user-specified query document. This user-specified query document is then compared for similarity to a set of documents contained in the database and measures of similarity scores are obtained. These measures of similarity scores provide answers regarding patent infringement between two patents, or synergy between companies and inventories, among others.

However, in general research applications, a user seeks answers to a "new set of questions" and is not looking to develop a similarity analysis between two documents but rather to develop "a thesis about a new subject matter". The "new subject matter" may be an assessment of the technical capabilities of a given company, a business strategy, a marketing analysis, type of material or human resources required to set-up a specific operation or to develop a specific type of technology. This type of research is usually performed manually in a non-systematic way. It is also cumbersome and takes a long time.

There is a need for an advanced method of researching electronically information in existing databases in order to develop via analysis and/or synthesis a new type of information database and ultimately "a thesis about a new subject matter".

SUMMARY OF THE INVENTION

In general, in one aspect, the invention provides a method of researching and analyzing information contained in a plurality of documents. The documents belong to a first database and are organized according to a first set of fields for an electronic search and retrieval by a computer. The method includes first conducting an electronic search of the first database to retrieve at least one document, then developing a second set of fields and then reading the at least one document to retrieve information pertaining to the user defined fields. The next step is entering into a second database the at least one document, the values of the first set of fields for the at least one document, the second set of fields and the retrieved information pertaining to the second set of fields and finally analyzing the information that is contained in the second database.

Implementations of the invention may include one or more of the following features. The first database may be searched based on the first set of fields, keywords, a Boolean phrase and on a "natural language" query. The first database may be a patent database, the documents may be patents and the first set of fields may be patent fields. The patent database may be the United States Patent and Trademark Office patent database, the European Patent Office patent database, the Japanese Patent Office patent database and an international patent database. The patent fields may be selected from a group consisting of Patent Number, Title, Assignee Name and Location, Filing date, Date of patent, Application Number, Inventor(s) Name, U.S. Class, U.S. Subclass, International Class, International Subclass, Field of Search, Number of references cited, Number of claims, Number of independent claims, Abstract, Name of Primary Examiner, Name of secondary Examiner or Name of attorney, agent, firm. The documents may be publications, books, newspapers, and magazines. The second set of fields may be user-defined fields and may be developed from answers to questions contained in a first input form. The user-defined field may include a core competency of an invention, a technology of an invention, an element of an invention, a business driver for an invention, a product of an invention, a field of an invention, a problem solved by an invention, an intellectual property strategy for an invention, a priority of an invention, a capability for producing an invention, a level of novelty of an invention, a market size for an invention, a maturity level of an invention, a level of importance of an invention, a patent strategy of an invention, a business strategy of an invention, ability to detect use of an invention, an estimate of use of an invention by competitors, an estimate of use of an invention by suppliers, an estimate of use of an invention by customers, an estimate of alliance potential generated by an invention, an estimate of technology transfer potential generated by an invention, a level of prestige generated by an invention, an estimate of licensing potential of an invention and an estimate of market potential generated of an invention. The second database may be an Access™ type database.

The step of analyzing the information contained in the second database includes entering the information into a spreadsheet and displaying the user-defined fields in graphs and tables. Each user-defined field may be associated with a value and the analyzing includes summation of the values for each user-defined field. More than one document may be retrieved. The method may also include developing a high level of abstraction view of the retrieved documents.

In general, in another aspect, the invention features an apparatus for researching and analyzing information contained in a plurality of documents including a computer system having a display and a central processing unit (CPU). The computer system accesses an Internet website. The Internet website has a first database that contains a plurality of documents organized according to first set of fields for an electronic search and retrieval by the computer system. The computer system also includes one or more computer instructions for conducting an electronic search of the first database to retrieve at least one document, one or more computer instructions for developing a second set of fields, one or more computer instructions for entering into a second database the at least one document, values of the first set of fields for the at least one document, the second set of fields and information pertaining to the second set of fields extracted via reading from the at least one document and one or more computer instructions for analyzing the information contained in the second database. The second database may be contained within the computer system.

Among the advantages of this invention may be one or more of the following. The invention provides a method of analyzing patents and extracting information pertaining to market, business, IP strategy, business strategy and technology for one or more inventions.

The details of one or more embodiments of the invention are set forth in the accompanying drawings and description below. Other features, objects and advantages of the invention will be apparent from the following description of the preferred embodiments, the drawings and from the claims.

BRIEF DESCRIPTION OF THE DRAWINGS

FIG. 4 is a worksheet input file for the core competencies field.

FIG. 5 is a worksheet input file for the technologies field.

FIG. 6 is a worksheet input file for the elements field.

FIG. 7 is a worksheet input file for the business driver's field.

FIG. 8 is a worksheet input file for the product categories field.

FIG. 9 is a worksheet input file for the fields of invention field.

FIG. 10 is a worksheet input file for the problems field.

FIG. 11 is a worksheet input file for the IP strategy field.

FIG. 12 is a worksheet input file for the priorities field.

FIG. 13 is a worksheet input file for the invention view field.

FIG. 14 is a worksheet input file for the applied invention matrix (AIM) class field.

FIG. 15 is a worksheet input file for the market size field.

FIG. 16 is a worksheet input file for the maturity of technologies field.

FIG. 17 is a worksheet input file for the importance of products field.

FIG. 18 is a worksheet input file for the patent strategy field.

FIG. 19 is a worksheet input file for the business strategy field.

FIG. 20 is a worksheet input file for the detectability field.

FIG. 21 is a worksheet input file for the competitors use field.

FIG. 22 is a worksheet input file for the suppliers use field.

FIG. 23 is a worksheet input file for the customers use field.

FIG. 24 is a worksheet input file for the alliance potential field.

FIG. 25 is a worksheet input file for the technology transfer field.

FIG. 26 is a worksheet input file for the prestige field.

FIG. 27 is a block diagram of a third input form.

FIG. 29 is a worksheet input file for the HLA framework.

FIG. 30 illustrates a representative screen shot for a patent record in the database 510.

FIG. 40 shows a prior art table indicating standard patent fields.

FIG. 41 shows a table listing all user fields and their definition.

FIG. 42 shows two tables illustrating Microsoft Excels Master Worksheet.

Like reference numbers and designations in the various drawings indicate like elements.

DETAILED DESCRIPTION OF THE PREFERRED EMBODIMENT

Figure 1:
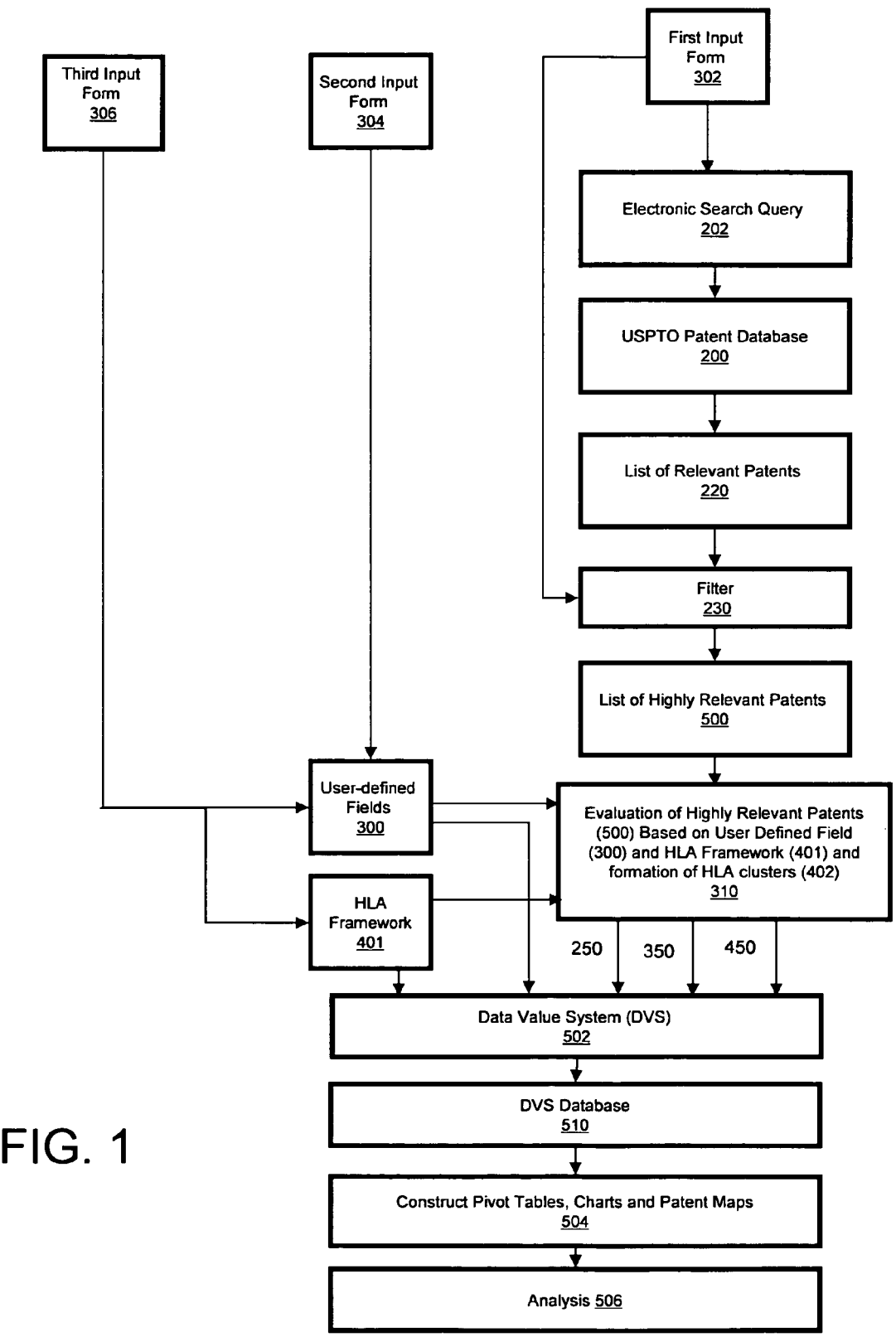
FIG. 1 is a block diagram of a patent mapping process according to this invention.

Referring to FIG. 1, a patent mapping process 100 includes the following steps. First a user fills out input forms 302, 304 and 306. Input forms 302, 304 and 306 are used to identify the user's areas of interests including product, technology, process, business, and market, among others. The information captured in input form 302 is used to define fields for an electronic search query 202 and to construct a filter 230. The information captured in input forms 304 and 306 is used to construct a High Level of Abstraction (HLA) framework 401 and user-defined fields 300. These user-defined fields 300 represent the specific interests of the user or the specific questions a user would like to answer.

Figure 2:
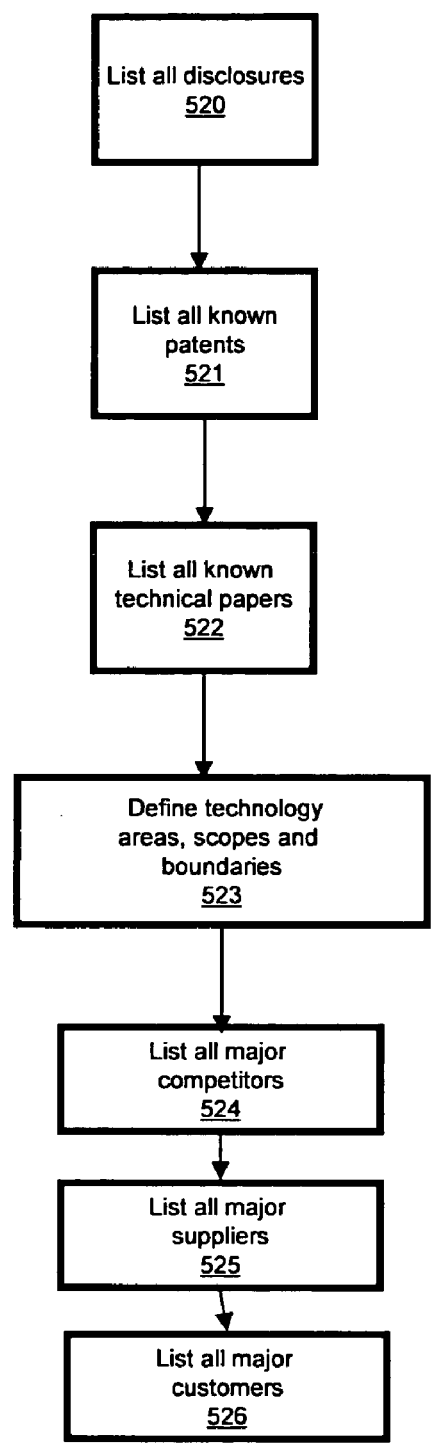
FIG. 2 is a block diagram of a first input form.

Referring to FIG. 2, in first input form 302 the user is asked to list all disclosures 520, patents 521 and technical papers 522 known to the user in the areas of interest, define the technology areas, scopes and boundaries for the mapping process 523 and list all major competitors 524, suppliers 525 and customers 526 in the areas of interest.

Figure 3:
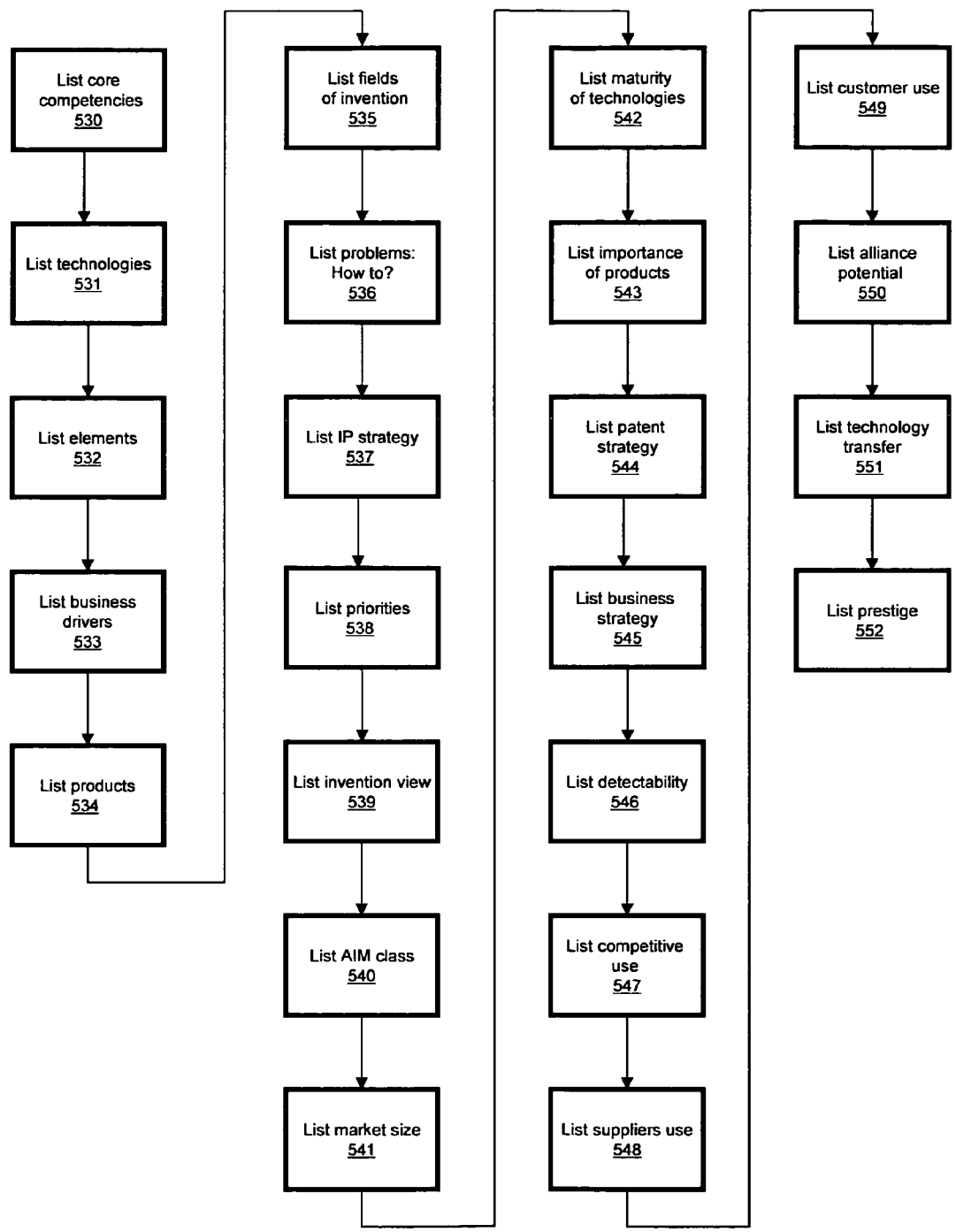
FIG. 3 is a block diagram of a second input form.

Referring to FIG. 3, in second input form 304, the user is asked to answer questions in specific areas including core competencies 530, technologies 531, elements 532, business drivers 533, products 534, fields of the invention 535, problems solved 536, intellectual property (IP) strategy 537, priorities 538, invention view capabilities 539, applied invention matrix (AIM), i.e., level of novelty 540, market size 541, maturity of technology 542, importance of products 543, patent strategy 544, business strategy 545, detectability of the invention 546, use of the invention by competitors 547, suppliers 548, and customers 549, alliance potential 550, technology transfer potential 551 and prestige 552. For each specific area a spreadsheet type input file is filled out that includes a list of all relevant parameters, their definition and a measure of their importance for the development of the specified product or technology. The information captured in input form 304 is user specific and varies from user to user. This information is used to transform user-specific conditions, constrains and measures into user-defined fields 300 and HLA framework 401, shown in FIG. 1.

In the question about core competencies, the user is asked to describe the technical expertise and skills that are needed to produce the inventions of interest. Examples of core competencies include mechanical engineer, software engineer, economist, database analyst, market analyst and marketing. Referring to FIG. 4, the core competencies input file for the development of a drug product includes a first column that lists all the type of special expert skills that are needed to produce the drug, a second column that describes each skill and a third column with a weight factor having values ranging from 1 to 10 indicating the weight of importance for each skill. In the example of FIG. 4, the expert skills needed to produce the drug are organic chemist, chemical engineer, biochemist, toxicologist, physical chemist, analytical chemist and a medical doctor.

In the question about technologies, the user is asked to describe the technologies utilized in developing the inventions of interest. Examples of technologies include robotics, semiconductor processes, quality control and quantitative analysis. Referring to FIG. 5, the input file for the technologies includes a first column that lists all the technologies, a second column that describes each technology and a third column with weight factors having values from 1 to 10 indicating the weight of importance for each technology. Among the technologies needed to produce the drug of FIG. 4 are organic chemistry, analytical chemistry, animal studies and manufacturing processes.

In the question about elements, the user is asked to describe the principal elements of the inventions. Examples of elements for an apparatus invention include all the actual elements of the invention. For a method type invention the elements include all the steps or processes of the invention. Referring to FIG. 6, the input file for the elements includes a first column that lists all the elements, a second column that describes each element and a third column with weight factors having values from 1 to 10 indicating the weight of importance for each element. Among the elements of the drug of FIG. 4 are its chemical formulation, user-friendly package and patient reaction.

In the question about business drivers, the user is asked to describe the commercial advantages of the inventions of interest. Examples of business drivers include higher yield, reduced cost, improved uniformity and reduced size. Referring to FIG. 7, the input file for the business drivers includes a first column that lists all the commercial advantages of the invention, a second column that defines each advantage and a third column with weight factors having values from 1 to 10 indicating the weight of importance for each advantage. Among the business drivers for the invention of the drug of FIG. 4 are its market response, user convenience and new treatment method.

In the question about products and product categories, the user is asked to describe the products of the inventions of interest. Examples of products include electrodes, business forecasting, business plans. Referring to FIG. 8, the input file for the products includes a first column that lists all the products, methods and processes that the invention produces, a second column that describes each product and a third column with weight factors having values from 1 to 10 indicating the weight of importance for each product. Among the product categories of the drug of FIG. 4 are included estrogen, calcitonin, estrogen inhibitors, disease treating and preventing drugs.

In the question about fields of invention, the user is asked to describe the specific fields of the inventions of interest. Examples of fields of invention include etching, temperature control, data processing, and data compression. Referring to FIG. 9, the input file for the fields of the invention includes a first column that lists all the specific fields of the invention, a second column that defines each field and a third column with weight factors having values from 1 to 10 indicating the weight of importance for each field. Among the fields of the invention for the drug of FIG. 4 are included synthetic chemistry, formulation and method of use of products.

In the question about problems, the user is asked to describe the major technical problems that the invention solves. Examples of problems include how to resist corrosion, compress data, and accelerate electrons. Referring to FIG. 10, the input file for the problems of the invention includes a first column that lists all the major problems that one would like to solve with the invention, a second column that describes each problem and a third column with weight factors having values from 1 to 10 indicating the weight of importance for each problem. Among the problems of the invention for the drug of FIG. 4 are included how to improve of bioavailability, how to improve drug acceptance and how to increase drug efficacy.

In the question about Intellectual Property (IP) strategy, the user is asked to rate the technologies or products of the inventions of interest according to the patent strategy of the user's company. The company patent strategy is used to plan product and technology development and to secure a competitive position in the market. If a company does not have a defined patent strategy this field is left empty and an initial map is completed without this information. The results of the initial map are used to develop a company patent strategy. This developed patent strategy is then used to update the results of the initial patent map. Referring to FIG. 11, the input file for the intellectual property strategy includes a first column that lists all the possible IP strategies for each technology or product of the invention, a second column that describes each product or technology, and a third column with weight factors having values from 1 to 10 indicating the weight of importance for each technology or product. In one example, the IP strategies include patenting around a competitor's patents, publishing in front of a competitor's patents, publishing around a competitor's patents, increasing understanding of a competitor's patents and belonging not in area of interest of a competitor's patents.

In the question about priorities, the user is asked to prioritize each technology and or product of the inventions. Referring to FIG. 12, the input file for the priorities of the technologies and products includes a first column that rates qualitatively the level of priority and a second column that lists each technology and/or product of the invention. In one example, the levels of priorities are rated as emergency, high, medium and low.

In the question about invention view, the user is asked to describe the capabilities needed to produce the products of the inventions of interest. Referring to FIG. 13, the input file for the invention view includes a first column that lists the user's own capabilities, competitor's capabilities and supplier's capabilities and a second column that describes user's capabilities, competitors' capabilities and suppliers' capabilities, respectively.

In the question about applied invention matrix (AIM) class, the user is asked to categorize the technology fields of the inventions of interest by the level of novelty. The novelty level is characterized as "breakthrough" for a very broad fundamental technology or product, "distinctive" for a unique method, offbeat approach, or intermediate improvement and "incremental" for a very detailed incremental improvement. Referring to FIG. 14, the input file for the AIM Class of the invention includes a first column that rates the novelty level and a second column that describes each product or technology of the invention.

In the question about market size, the user is asked to estimate the market size range for the technology fields and products of the inventions of interest. Referring to FIG. 15, the input file for the market size includes a first column that rates the market size range and a second column that describes each product or technology of the invention. In one example, the market size ranges include 1 million to 10 million dollars, 10 million to 100 million dollars, 100 million to 1 billion dollars, 1 billion to 5 billion dollars and greater than 5 billion dollars.

In the question about maturity of technology, the user is asked to rate the maturity of the technology and products of the inventions of interest. Referring to FIG. 16, the input file for the maturity of technologies includes a first column that rates the technology maturity level, a second column that describes each product or technology of the invention and a third column with weight factors having values from 1 to 10 indicating the weight of importance for each technology or product. In one example, the maturity level is characterized as "last generation", "current generation" and "emerging generation".

In the question about importance of the invention to current or planned products the user is asked to rate the importance of the invention for current or planned company products. Referring to FIG. 15, the input file for the importance of the products includes a first column that rates the importance of a product, a second column that describes each product or technology of the invention and a third column with weight factors having values from 1 to 10 indicating the weight of importance. In one example, the importance is characterized as "peripheral" for user or supplier related inventions, "element of a product" for a product manufactured by the user's company and is interchangeable with another type of product from the user's company or from another company, "essential to a product" for a product essential to the user's product line and "creates a product" if the invention can be used to make the entirety of a new product.

In the question about patent strategy, the user is asked to rate the strategic importance of the invention to the overall company patent strategy. Referring to FIG. 18, the input file for the patent strategy includes a first column that rates the invention according to the company's patent strategy, a second column that describes each product or technology of the invention and a third column with weight factors having values from 1 to 10 indicating the weight of importance. In one example, the different categories for the strategic importance of the invention to the overall company patent strategy include, "no patent strategy in the invention field", "high strategic importance", "medium strategic importance" and "low strategic importance".

In the question about business strategy, the user is asked to rate the importance of the technologies or products of the invention to the overall company business strategy. Referring to FIG. 19, the input file for the business strategy includes a first column that rates the business strategy, a second column that describes each product or technology of the invention and a third column with weight factors having values from 1 to 10 indicating the weight of importance. In one example, the different categories for the strategic importance of the invention to the overall company business strategy include, "no business strategy in the invention field", "high business importance", "medium business importance" and "low business importance".

In the question about detectability, the user is asked to rate the technologies or products of the invention by the ability to detect their use by others. In general, it is easy to detect the use of an apparatus or a product of an invention by others whereas the use of methods and processes are often undetectable. Referring to FIG. 18, the input file for the detectability includes a first column that rates the detectability, a second column that describes each product or technology of the invention and a third column with weight factors having values from 1 to 10 indicating the weight of detectability. In one example, the ability to detect the use of an invention by others is rated as "obvious", "easily detected", "detectable with work" and "undetectable". In the drug example of FIG. 4, the methods for coating, tabletting, packaging, use and combination with other products are rated as "obvious". The methods of chemical formulation and synthetic chemistry are rated as "detectable with work".

In the question about competitive use, the user is asked to rate the technologies or products of the invention by the percentage of competitors who would use them. Referring to FIG. 21, the input file for the competitive use includes a first column that rates the competitive use and a second column that describes each product or technology of the invention. In one example, the ratings for the competitive use include "less than 10% of competitors will use", "10% to 50% of competitors will use", "most competitors will use", "unknown" and "will only be used by user's company". In the drug example of FIG. 4, it is estimated that most competitors will use the methods of tabletting, coating and packaging, whereas only 10% to 50% percent of the competitors will use the methods of formulation, use, synthetic chemistry and combination of products.

In the question about suppliers' use, the user is asked to rate the technologies or products of the invention by the percentage of suppliers who would use them. Referring to FIG. 22, the input file for the suppliers' use includes a first column that rates the suppliers use and a second column that describes each product or technology of the invention. In one example, the ratings for the suppliers' use include "less than 10% of suppliers will use", "10% to 50% of suppliers will use", "most suppliers will use", and "unknown". In the drug example of FIG. 4, it is estimated that most suppliers will use the synthetic chemistry method, whereas less than 10% percent of the suppliers will use the methods of formulation, use, tabletting, coating, packaging methods and combination of products.

In the question about customer use, the user is asked to rate the technologies or products of the invention by the percentage of customers who would use them. Referring to FIG. 23, the input file for the customer use includes a first column that rates the customer use and a second column that describes each product or technology of the invention. In one example, the ratings for the customer use include "no customer will use", "less than 10% of customers will use", "10% to 50% of customers will use", "most customers will use", and "unknown". In the drug example of FIG. 4, it is estimated that no customer will use the methods for synthetic chemistry, chemical formulation, use, tabletting, coating, packaging methods and combination of products.

In the question about alliance potential, the user is asked to rate the technologies or products of the invention by the level of potential current or anticipated alliance activity that the invention will enable between the user's company and other companies. Referring to FIG. 24, the input file for the alliance potential includes a first column that rates the alliance potential and a second column that describes each product or technology of the invention. In one example, the alliance potential is rated as "low", "medium", "high" and "unknown". In the drug example of FIG. 4, the alliance potential for the method for tabletting is rated as "low", for the methods of packaging and formulation as "medium" and for the methods for synthetic chemistry, coating, use and combination of products as "high".

In the question about technology transfer, the user is asked to rate the technologies or products of the invention by the level of current or anticipated technology transfer that the invention will enable between the user's company and other companies. Referring to FIG. 25, the input file for the technology transfer includes a first column that rates the technology transfer probability and a second column that describes each product or technology of the invention. In one example, the technology transfer potential is rated as "low", "medium", "high" and "unknown". In the drug example of FIG. 4, the technology transfer potential for the methods of tabletting and coating is rated as "low", for the methods of packaging and formulation as "medium" and for the methods for synthetic chemistry, use and combination of products as "high".

In the question about prestige, the user is asked to rate the technologies or products of the invention by the level of prestige or recognition that may bring to the inventors and the company. Referring to FIG. 26, the input file for the prestige includes a first column that rates the prestige level and a second column that describes each product or technology of the invention. In one example, the prestige level is rated as "low", "medium" and "high". In the drug example of FIG. 4, the prestige level for the methods of tabletting and formulation is rated as "low", for the methods of packaging, coating and synthetic chemistry as "medium" and for the methods of use and combination of products as "high".

Referring back to FIG. 1, the information captured in third input form 306 is used to develop a High Level of Abstraction (HLA) framework 401 for a specific technology or product. Referring to FIG. 27, third input form 306 includes a first step 560, where the user is asked to separate the products and technologies into general categories, a second step 562, where the user is asked to separate the general categories into a first set of sub-categories, a third step 564, where a user is asked to separate each first sub-category into another level of sub-categories and a fourth step 566, where the user is asked to enter the results from the first, second and third steps into a spreadsheet.

Figure 28:
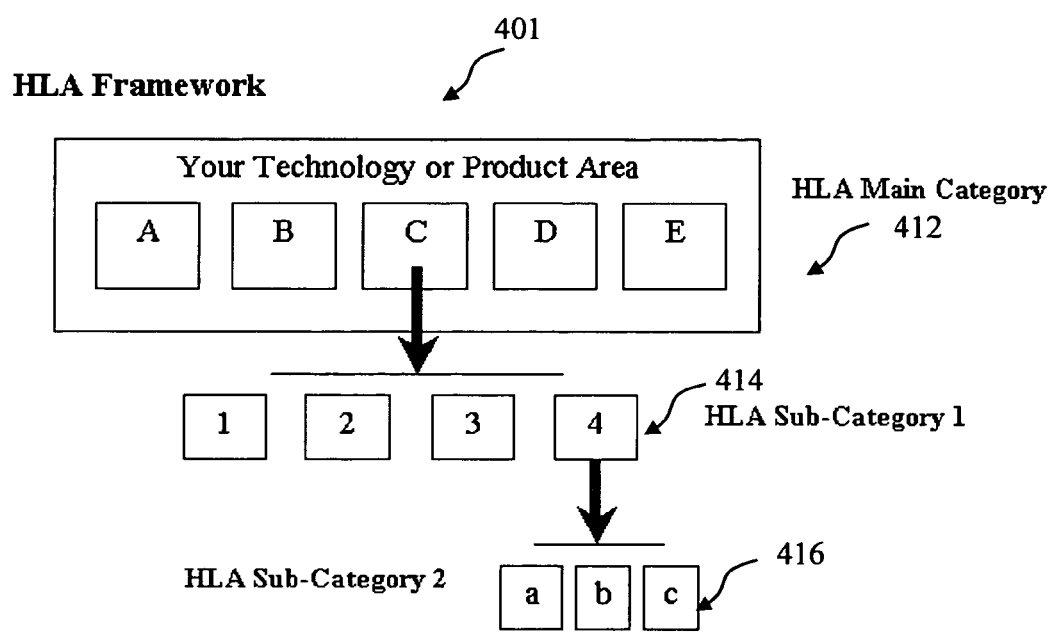
FIG. 28 is a block diagram for the high level of abstraction (HLA) Framework.

Referring to FIGS. 28 and 29, the HLA framework 401 includes a main category 412 and a first and second sub-categories, 414 and 416, respectively. In one example, the specific product is a computer 420 and the HLA main categories 412 are the processor 422, monitor 424, and the input devices 426. The first subcategories 414 of the processor 422 main category are the motherboard 428, the graphics board 430 and the disk drives 432. The first subcategory of the monitor 424 main category is the screen 434. The first subcategories of the input devices 426 are the mouse 436 and the keyboard 438. The second subcategories 416 of the motherboard 428 first subcategory are the CPU 440, the cache 442, and the ports 444. The second subcategories 416 of the mouse 436 first subcategory are the buttons 446. The HLA framework is applied to the group of relevant patents 500 to form HLA clusters 402 of the collected patents. Each patent in the group of relevant patents 500 is evaluated and placed in the appropriate HLA cluster 450. Both the formation of HLA clusters and the extraction of information to fill-out the user-defined fields occur during the reading and evaluation of the patents 310.

Referring again to FIG. 1, after filling out input forms 302, 304 and 306 the user conducts an electronic search 202 of the USPTO patent database 200. The USPTO database 200 is indexed according to standard patent fields 210, which are listed in FIG. 40. The user can search the USPTO database 200 based on one or more of the standard patent fields 210. In one example, an electronic search is conducted for an patents issued to a specific assignee in a given specific time period. The first patent field is the assignee name and the second is the year. The result of such an electronic search is a list of patents 220 which belong to the specified assignee and were issued on a specified date. In addition to a patent field, the USPTO database can also be searched via a "keyword". In this case one or more keywords are formulated into a Boolean phrase and the database is searched for patents that contain the defined Boolean phrase. A user can also search the USPTO database via a "natural language" query described in U.S. Pat. No. 6,038,561, incorporated herein by reference.

Continuing to refer to FIG. 1, in the next step a filter 230 is applied to the list of patents 220. Filter 230 is developed based on the information contained in the input form 302. The result of filtering is a list of more relevant patents 500. As was mentioned above, based on the information contained in the second input form 304 user-defined fields 300 are developed. The user-defined fields 300 are used to evaluate the list of relevant patents 500. The evaluation 310 includes reading each patent and extracting information pertaining to the user defined fields 300. These user-defined fields 300 are not directly described in the specifications of the relevant patents 500. In some cases they are mentioned in the patents but in most cases they are inferred by the description of the invention. In one example, when a material is described to be processed by chemical vapor deposition (CVD) it can be inferred that the capabilities needed to produce this material include a CVD reactor, expertise and equipment in high vacuum, specialty gases and scrubbing systems for poisonous gases. To conduct this type of evaluation 310 a knowledgeable individual reads and analyzes each patent in the group of relevant patents 500 and extracts information pertaining to each user-defined field 300 either directly or via inference.

In the next step a data value system (DVS) 502 receives the information pertaining to the specific patent field queries 250, the information pertaining to the specific user-defined field queries 350 and the clustered patents 402 and enters them into a DVS database 510. In one example the DVS database 510 is formulated as an Access™ type database provided by Microsoft Inc. An Access™ type database can accommodate a large number of documents and each document is allowed to have several fields. Information of predetermined types is entered into the fields and the information is accessed via a query based on the same predetermined fields. In addition to this type of field based query, the Access™ type database provides a query language so that a user can form relational inquires into the database. An example of a relational inquiry for database 510 includes a specific patent number "AND" a business driver field "FOR" a specific technology field.

Figure 30:
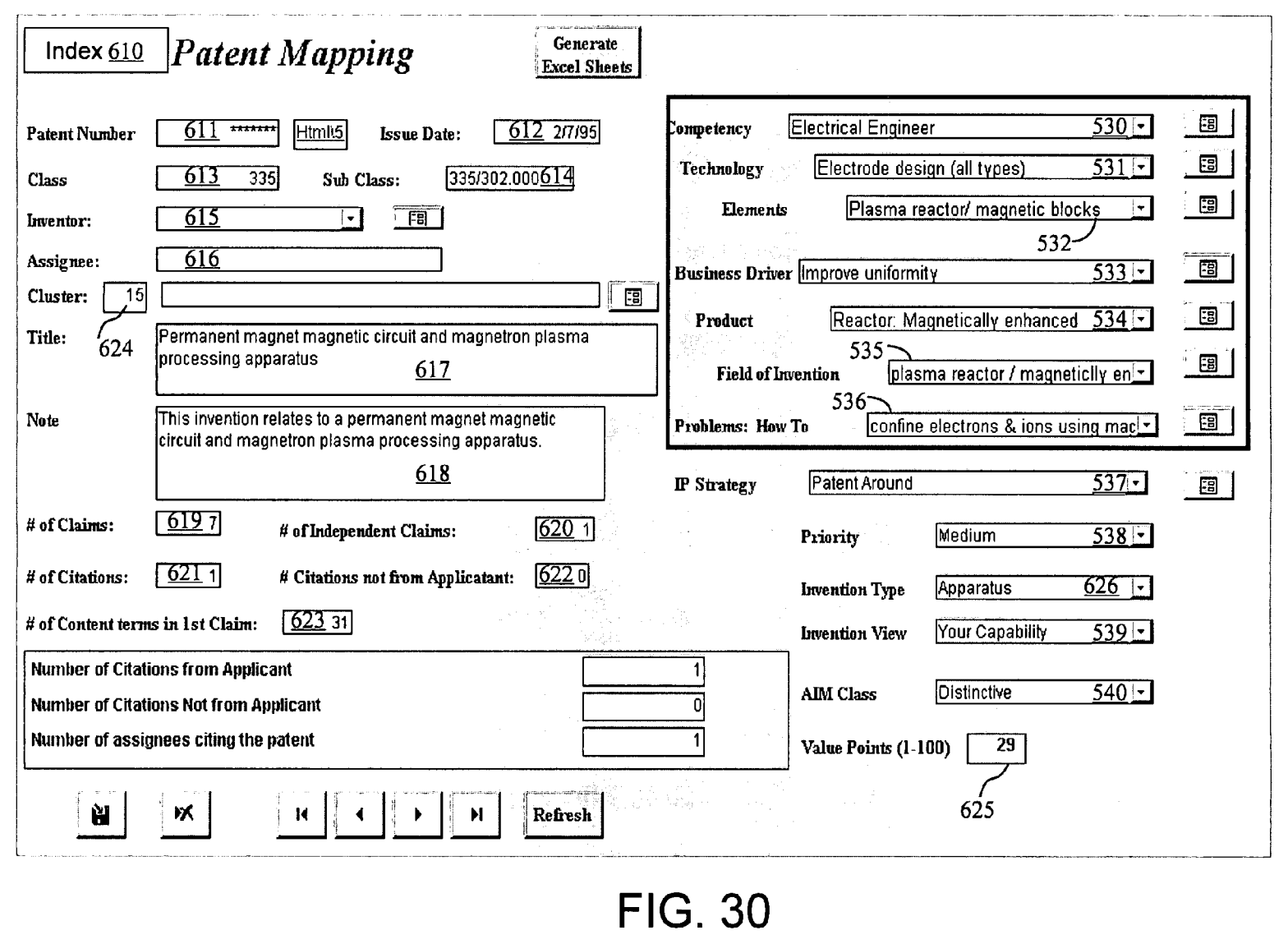

Referring to FIG. 30, a screen shot of an Access™ type database 510 includes for each patent belonging to group 500 an index number 610, the information for all the requested patent fields including, patent number 611, issue date 612, class 613, subclass 614, inventor names 615, assignee name 616, title 617, abstract 618, number of total claims 619, number of independent claims 620, number of citations 621, number of citations originating not from the applicants 622, number of content terms in first claim 623, and number of content terms in exemplary claim (not shown). The database also includes the information for all the user-defined fields 300, such as, core competency 530, technology 531, elements 532, business drive 533, product 534, field of invention 535, problems solved 536, IP strategy 537, priority 538, invention type 626, invention view 539 and novelty level (AIM) 540. Each patent is also assigned a cluster number 624.

Referring to FIG. 42, the information contained in the Access™ database 510 is used to construct an Excel™ type spreadsheet 650. Spreadsheet 650 has columns 660 including all patent fields 651, all user-defined fields 300 and all the values associated with the user-defined fields. The values are summed for each user defined field and the sums are displayed on the spreadsheet (not shown) and on the screen shot 625, shown in FIG. 30. The Excel™ spreadsheet is used to construct Pivot™ Tables, Graphs and Patent Maps 504 and to analyze the data 506, as shown in FIG. 1. Examples of analyses include a product analysis, a technology analysis, a business driver's analysis, a core competency analysis, a timing analysis, a silver bullet analysis, a claims analysis, a patent assessment tool analysis and a summary analysis.

Figure 31:
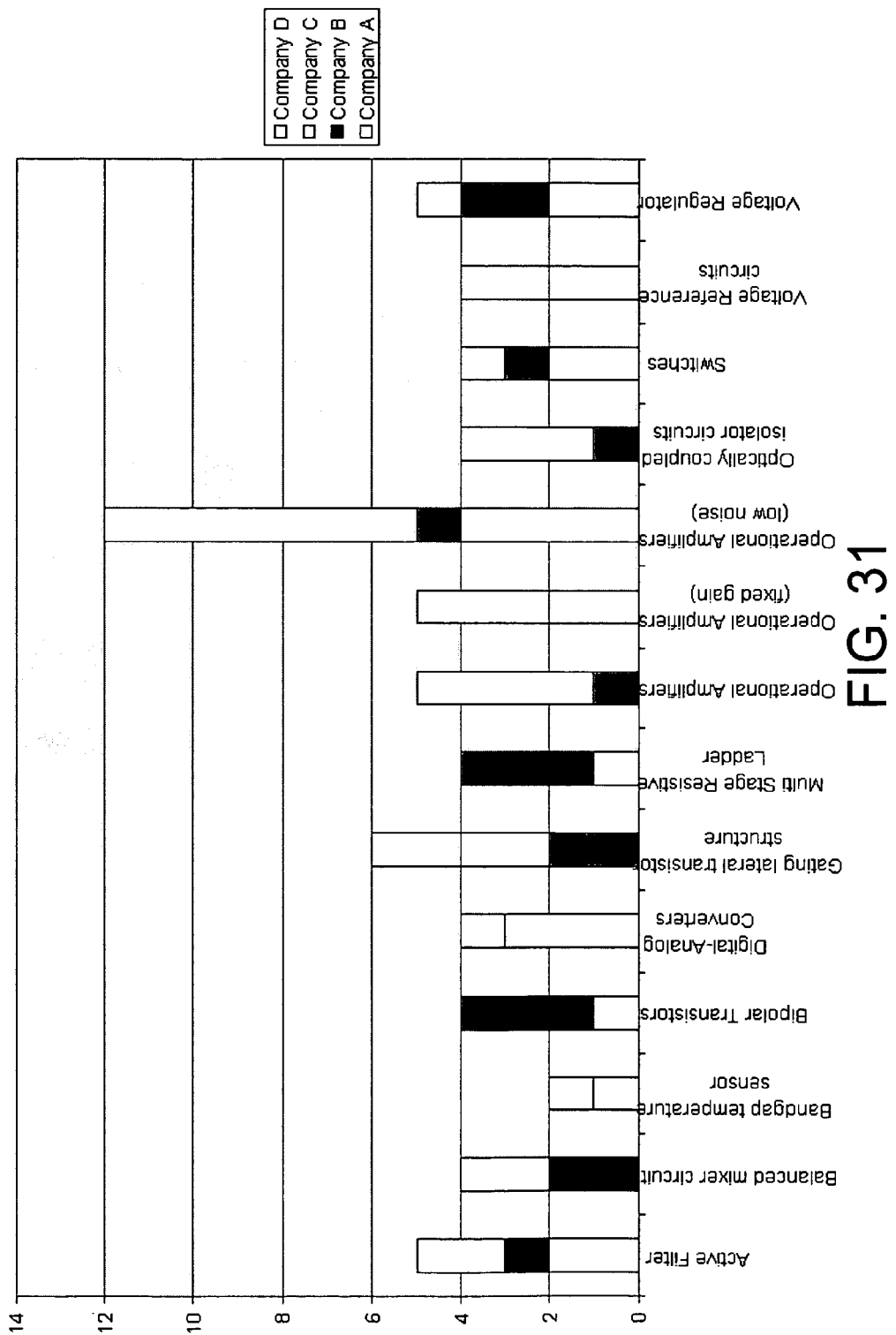
FIG. 31 is a bar graph depicting the IP space for electronic equipment occupied by four competing companies A, B, C and D.

Referring to FIG. 31, in one example, the IP space for electronic equipment manufactured by four competing companies, A, B, C and D is segmented by specific product type. The largest product segment includes patents on low noise operational amplifiers and company C occupies the majority space in this segment. The smallest product segment includes patents on bandgap temperature sensors and companies A and C are the two major competitors sharing this segment space. Other segments include patents on active filter, balanced mixer circuit, bipolar transistors, digital-analog converters, gating lateral transistor structure, multi stage resistive ladder, operational amplifiers (other than low noise or fixed gain), operational amplifiers with fixed gain, optically coupled isolator circuits, switches, voltage reference circuits and voltage regulators.

Figure 32:
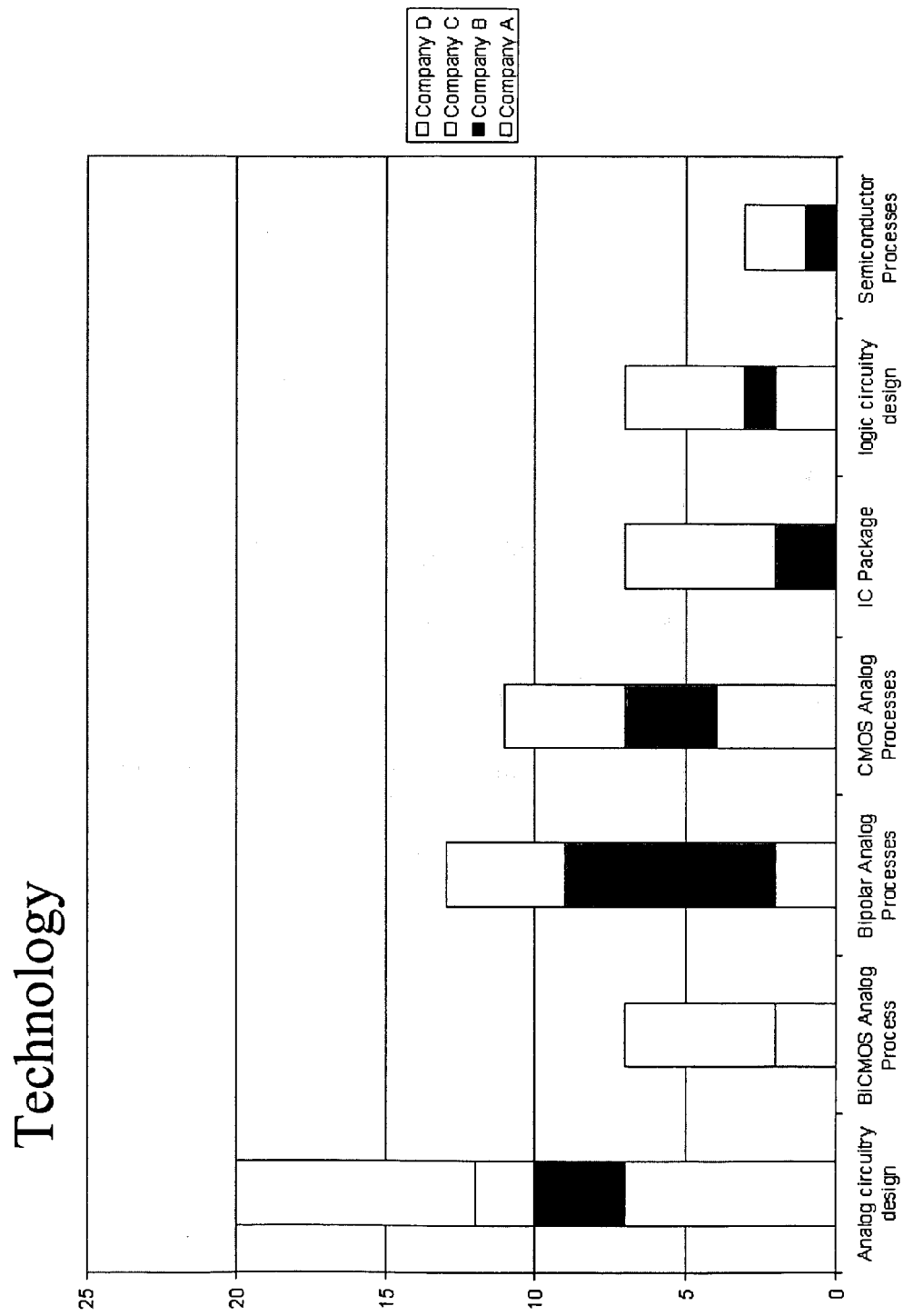
FIG. 32 is a bar graph depicting the technology space occupied by the four competing companies A, B, C and D of FIG. 31.

Referring to FIG. 32, in one example, the technology IP space of the same four major competitors A, B, C and D of FIG. 31 is segmented by specific processes and technologies. The segments include analog circuitry design, BiCMOS analog process, Bipolar analog processes, CMOS analog processes, IC Package, logic circuitry design and semiconductor processes. The largest technology segment includes patents on analog circuitry design and companies A and C dominate this segment. The smallest technology segment includes patents on semiconductor processes and companies B and C dominate this segment.

Figure 33:
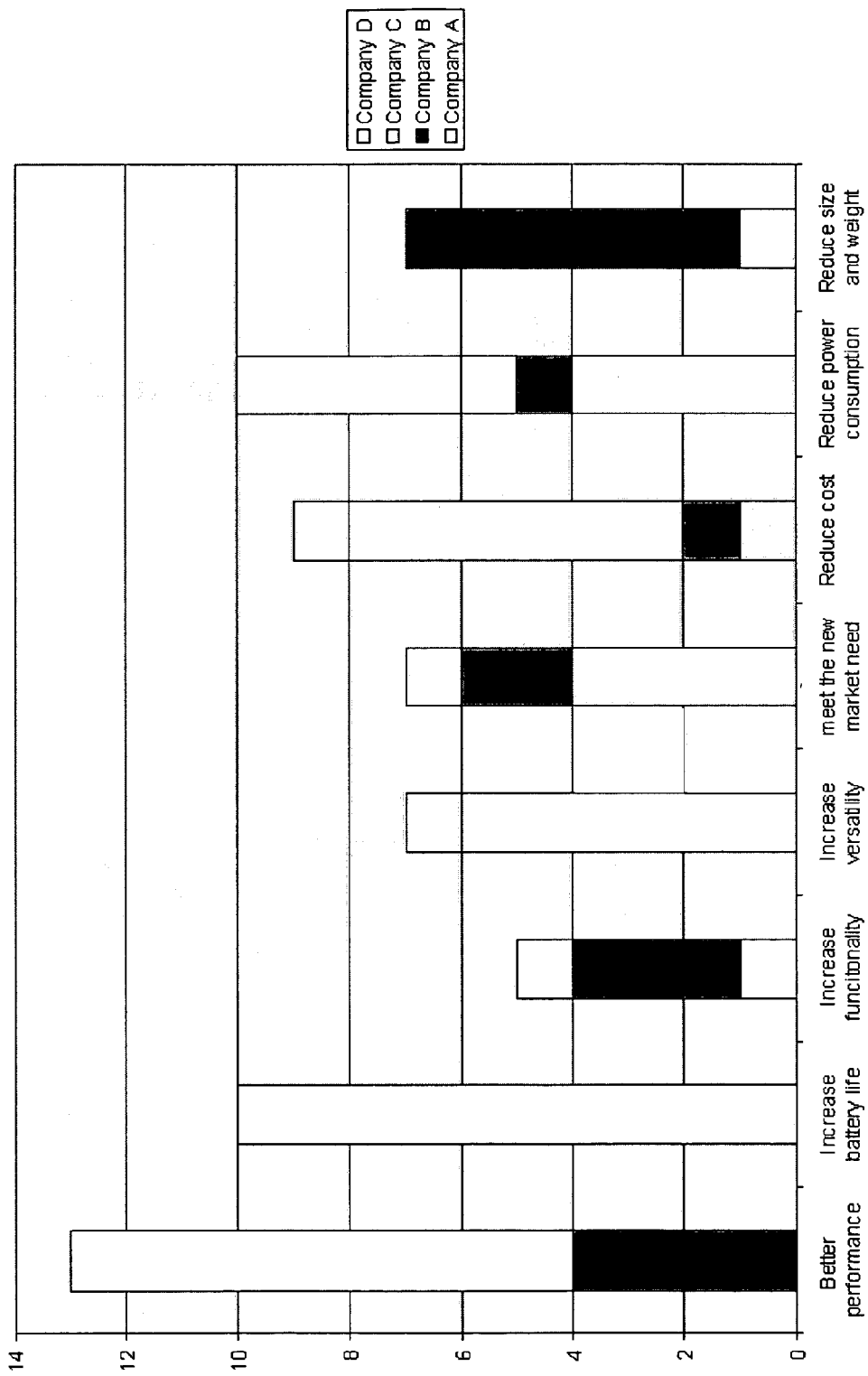
FIG. 33 is a bar graph depicting the business drivers for the four competing companies A, B, C and D of FIG. 31.

Referring to FIG. 33, the business drivers of the same four major competitors A, B, C and D of FIG. 31 include better performance, increase battery life, increase functionality, increase versatility, meet the new market needs, reduce cost, reduce power consumption, reduce size and weight. The main drivers are better performance, reduce power consumption, increase battery life and reduce cost.

Figure 34:
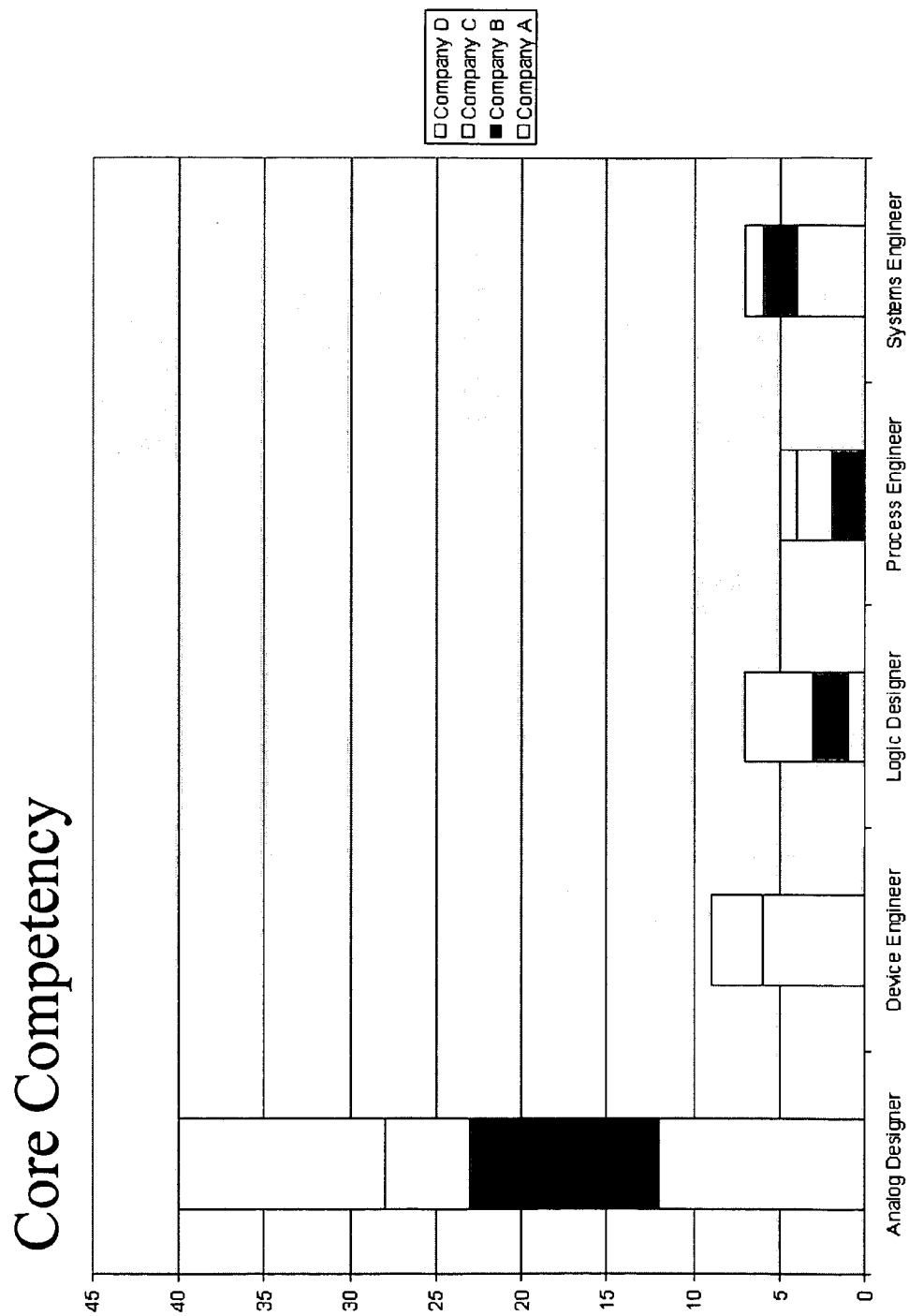
FIG. 34 is a bar graph depicting the core competencies for the four competing companies A, B, C and D of FIG. 31.

Referring to FIG. 34, the core competencies of the same four major competitors A, B, C and D of FIG. 31 include analog designer, device engineer, logic engineer, system engineer and process engineer. The main core competency for all four companies is the analog designer.

Figure 35:
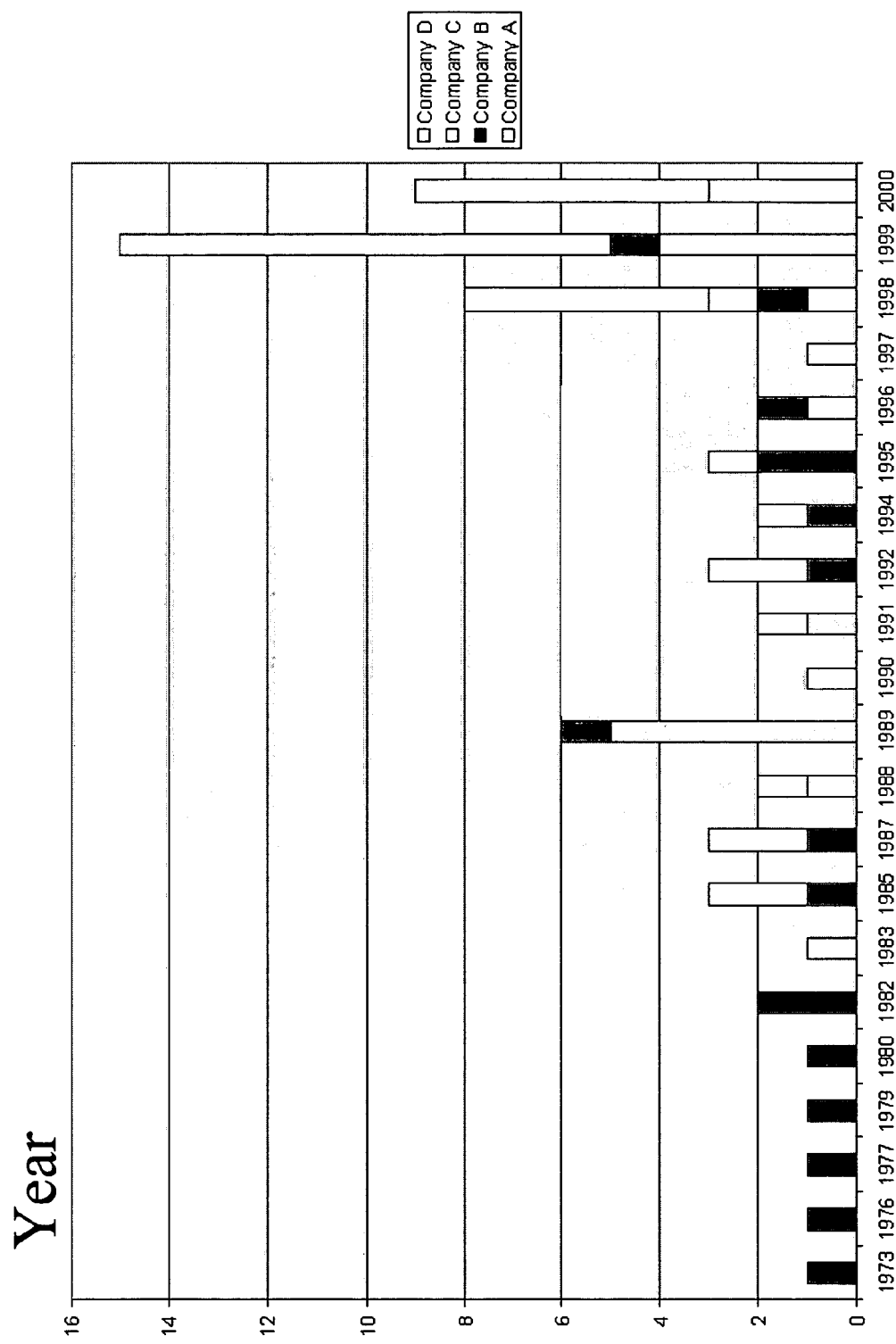
FIG. 35 is a bar graph depicting the year the patents belonging to the four competing companies A, B, C and D of FIG. 31 were issued.

Referring to FIG. 35, a timing analysis of the same four major competitors A, B, C and D of FIG. 31 indicates that the majority of the patents were issued in years 1998, 1999 and 2000 and the majority of these patents were granted to company D. Company B owns most of the patents issued in the early years from 1973 to 1982. Company B continues to patent inventions in this field, but not to the same extend as companies A, C and D.

Figure 36:
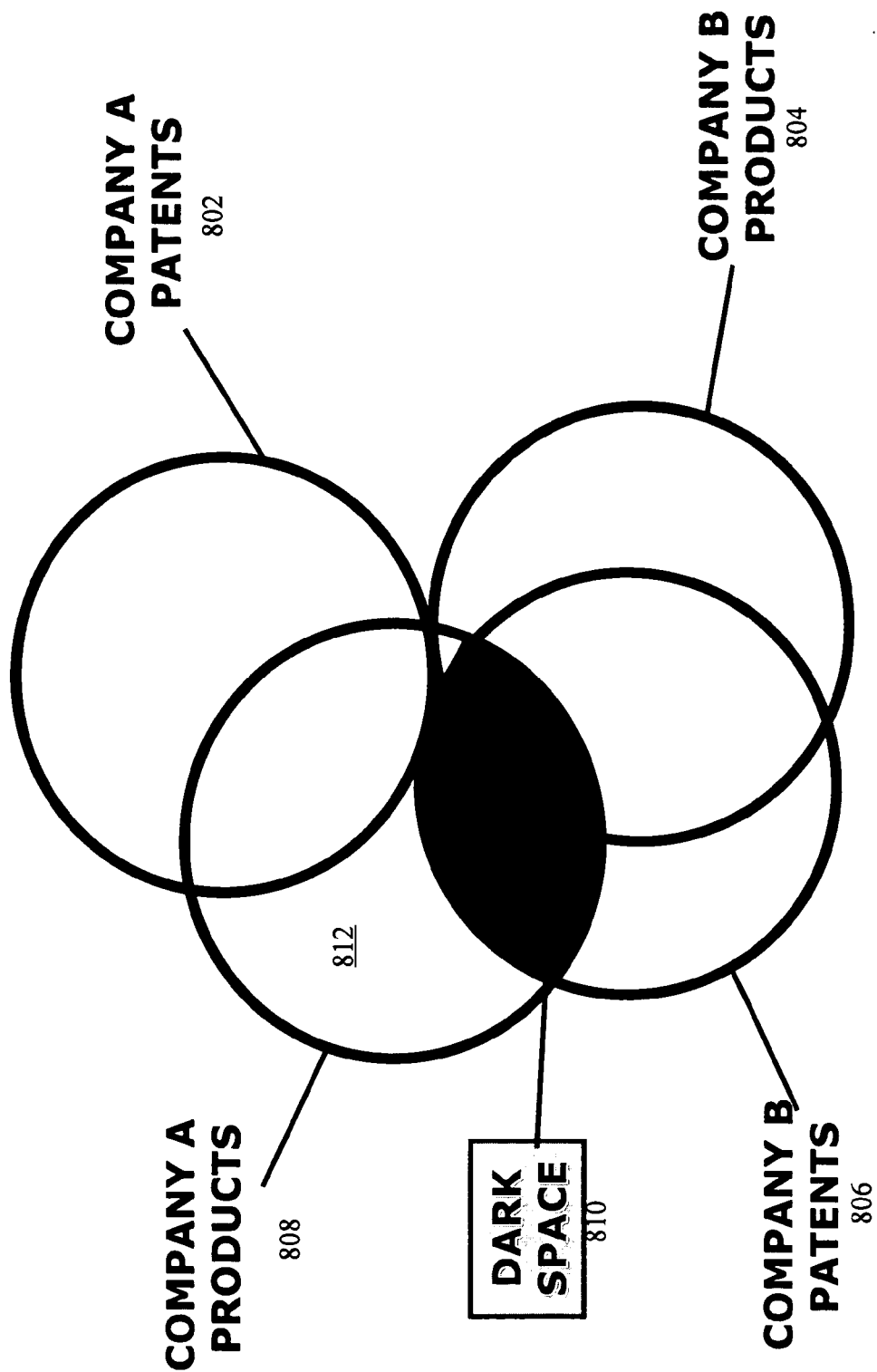
FIG. 36 is a Venn diagram depicting a first example of the IP and product space occupied by companies A and B.

Based on the analysis of the patent mapping results the IP space occupied by a company is mapped out in connection to the IP space occupied by other companies, the space occupied by its own products and the space occupied by other companies products. Referring to FIG. 36, the IP space of company A, represented by Venn diagram 802, intersects the space where company A has products, represented by Venn diagram 808, and is tangential to the IP spaces of company B IP space, represented by Venn diagram 806. Company B IP space 806 intersects the space where company B has products, represented by Venn diagram 804 and the product space 804 is tangential to the IP space of company A 802. However, the product space of company A 808 intersects both the IP space 806 and product space 804 of company B. The common area 810 between company A product space 808 and company B IP space 806 is called the dark space and indicates a space where company B has patents and company A has products which may violate company B's patent space. Dark space 810 identifies licensing opportunities for company B. Area 812 where company A has products but neither company A or company B have patents is called the gray space. Grey space 812 identifies opportunities for patenting for both company A and company B.

Figure 37:
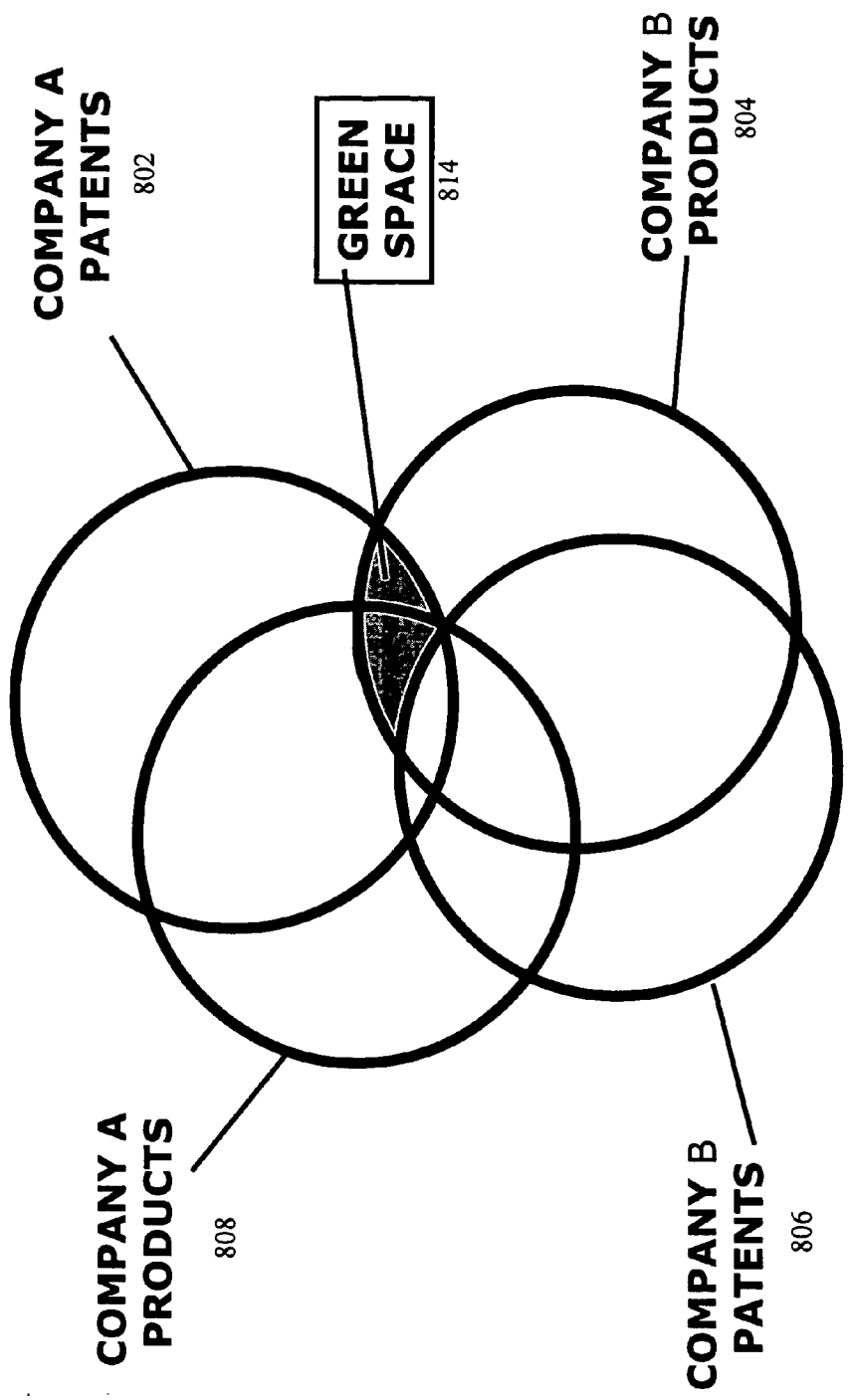
FIG. 37 is a Venn diagram depicting a second example of the IP and product space occupied by companies A and B.

Referring to FIG. 37, company B's product space 804 intersects company A's IP space 802 and company B's IP space. The intersect space between company A' IP space and company B's product space minus the space occupied by company B's IP space defines a green space 814 where company A has IP and company B has products violating company A's IP space. The green space 814 identifies licensing opportunities for company A.

Figure 38:
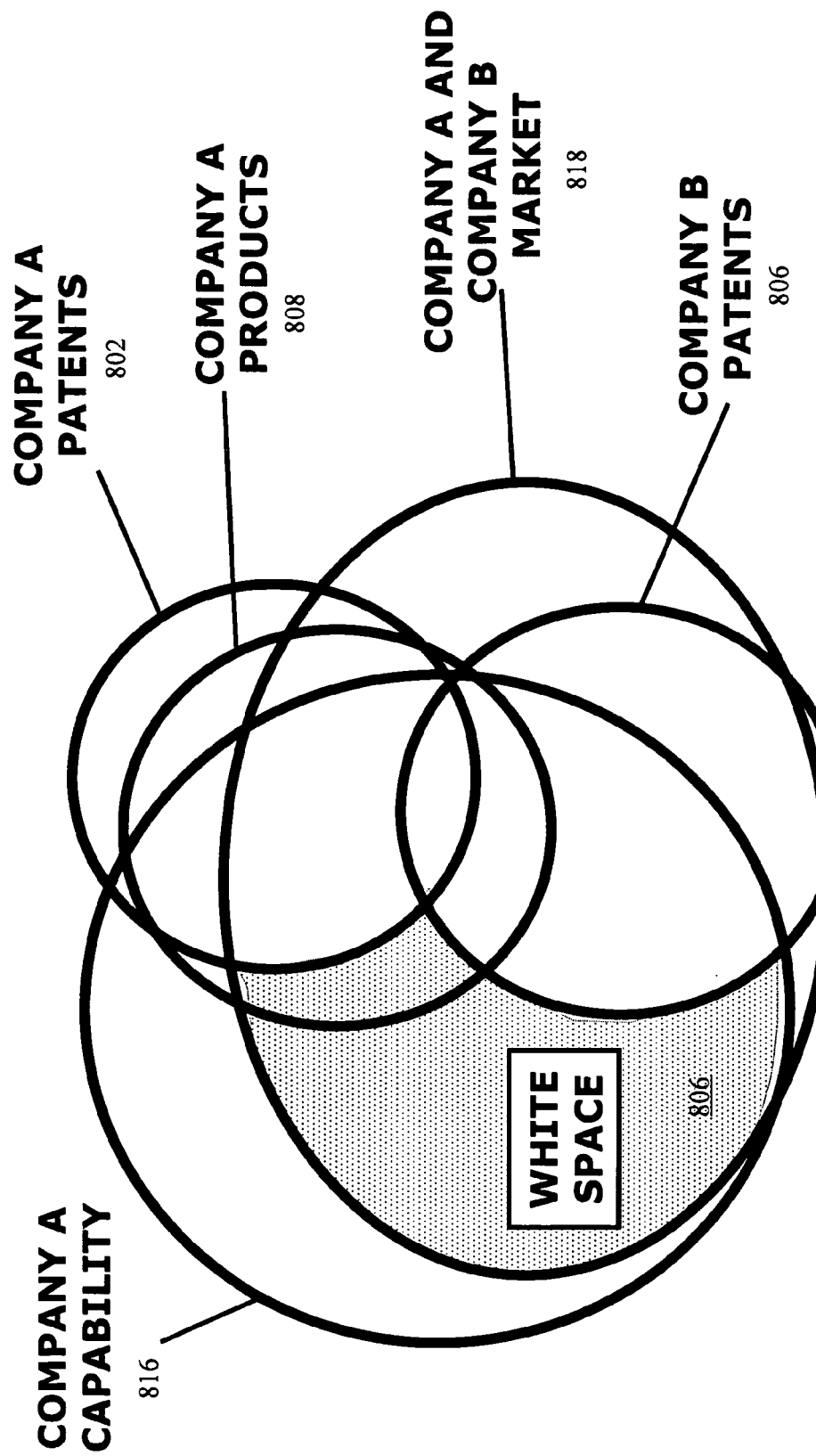
FIG. 38 is a Venn diagram depicting a third example of the IP and product space occupied by companies A and B.

Referring to FIG. 38, there is a fourth space area called white space, represented by Venn diagram 820 where no patents exist, but company A has a developed a capability, represented by Venn diagram 816 and there is a market need, represented by Venn diagram 818. White space 820 identifies new opportunities for patenting for company A.

Figure 39:
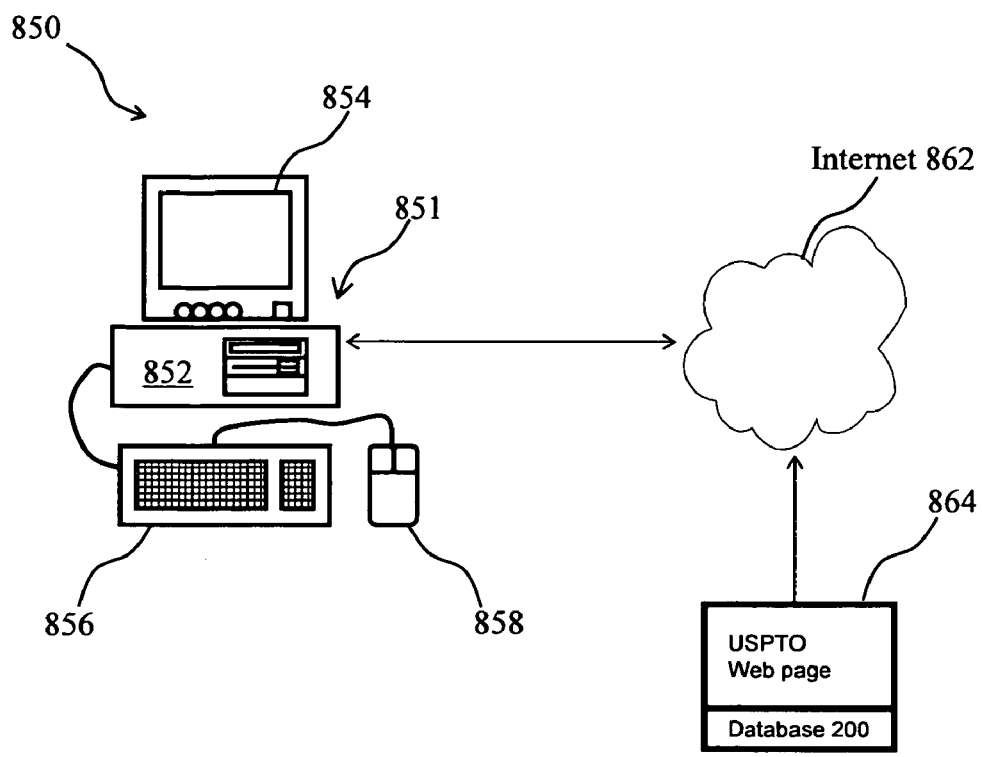
FIG. 39 is an apparatus for implementing the mapping process of this invention.

Referring to FIG. 39, an apparatus 850 for implementing the mapping process 100 includes a computer system 851, connected to the Internet 862. The computer system 851 includes a CPU unit 852, a screen 854, a keyboard 856, and a mouse 858. The CPU unit includes additional components of the computer system 851 (not shown) such as a processor, memory, a disk drive, a compact disc read only memory and an interface system for connecting to the Internet 862. The USPTO has a Webpage 864 accessible via the Internet 862. The USPTO Webpage 864 contains the searchable patent database 200. A search query is send from the computer system 851 to the USPTO database 200. The search results are received by the computer system 851 and entered in database 500 housed in the computer system 851. The computer system 851 is part of a network (not shown) that includes other computer systems connected with each other and with computer system 851 so that database 500 can be shared and viewed simultaneously by several users.

In other embodiments the searchable database 200 of FIG. 1 may be the European Patent Office (EPO) database, the Japanese Patent Office database or an international patent database. Database 200 may also contain publications, magazines, books, and websites. The many features and advantages of the present invention are apparent from the detailed specification, and, thus, it is intended by the appended claims to cover all such features and advantages of the described apparatus that follow the true spirit and scope of the invention. Furthermore, since numerous modifications and changes will readily occur to those of skill in the art, it is not desired to limit the invention to the exact construction and operation described herein. Moreover, the process and apparatus of the present invention, like related apparatus and processes used in medical applications tend to be complex in nature and are often best practiced by empirically determining the appropriate values of the operating parameters or by conducting computer simulations to arrive at a best design for a given application. Accordingly, other embodiments are within the scope of the following claims.

What is claimed is:

1. A method of researching and analyzing information contained in a plurality of documents belonging to a first database, searchable on a plurality of search fields and having a plurality of search field values, the method comprising the steps of:
   a) developing a set of search arguments relating to one or more interests of a user;
   b) developing a set of user-defined fields relating to said one or more interests, said set of user-defined fields being distinct from said set of search arguments;
   c) searching the first database using at least some of said set of search arguments so as to retrieve a plurality of retrieved documents from among the plurality of documents;
   d) reading each of said plurality of retrieved documents so as to extract from each of said plurality of retrieved documents a user-defined field value for at least one user-defined field of said set of user-defined fields so as to obtain a plurality of user-defined field values;
   e) entering said plurality of user-defined values extracted in step d) into a second database;
   f) entering the ones of the plurality of search field values corresponding to said plurality of retrieved documents into said second database;
   g) filling out a high level of abstraction (HLA) framework form so as to form a plurality of HLA clusters; and
   h) assigning each of said plurality of retrieved documents to a corresponding respective one of said plurality of HLA clusters.

2. A method according to claim 1, further comprising subsequent to step c) the step of filtering said plurality of retrieved documents based on at least some of said set of search arguments so as to obtain a refined set of documents, step d) being performed relative to said refined set of documents.

3. A method according to claim 1, wherein each of said plurality of HLA clusters has a corresponding cluster identifier and the method further comprises the step of entering into said second database for each of said plurality of retrieved documents one of said cluster identifiers.

4. A method according to claim 1, further comprising the step of associating, for each of said plurality of retrieved documents, a weight with each of at least some of said plurality of user-defined fields.

5. A method according to claim 4, further comprising the step of entering said weights into said second database.

6. A method according to claim 4, further comprising the step of tallying said weights for each of said plurality of retrieved documents.

7. A method according to claim 1, wherein step a) includes the step of at least partially populating a first input form.

8. A method according to claim 7, wherein the step of at least partially populating said first input form comprises populating said first input form with known documents already known to the user.

9. A method according to claim 1, wherein step b) includes the step of at least partially populating a second input form.

10. A method according to claim 9, wherein the step of at least partially populating said second input form includes populating said second input form with answers to questions relating to a business of the user.

11. A method according to claim 10, further comprising the step of assigning weights to at least some of said answers.

12. A method of researching and analyzing information contained in a plurality of documents belonging to a first database, searchable on a plurality of search fields and having a corresponding plurality of search field values, the method comprising the steps of:
   a) receiving a set of search arguments relating to one or more interests of a user;
   b) receiving a set of user-defined fields relating to said one or more interests, said set of user-defined fields being distinct from said set of search arguments;
   c) searching the first database using at least some of said set of search arguments so as to retrieve a plurality of retrieved documents from the plurality of documents;
   d) receiving, for each of said plurality of retrieved documents, a user-defined field value for at least one user-defined field of said set of user-defined fields so as to receive a plurality of user-defined field values, said plurality of user-defined field values having been extracted from said plurality of retrieved documents;
   e) entering said plurality of user-defined values received in step d) into a second database;
   f) entering the plurality of search field values into said second database; and
   g) presenting a high level of abstraction (HLA) framework form to a user.

13. A method according to claim 12, further comprising subsequent to step c) the step of filtering said plurality of retrieved documents based on at least some of said set of search arguments so as to obtain a refined set of documents, step d) being performed relative to said refined set of documents.

14. A method according to claim 12, further comprising the step of receiving an HLA cluster identifier for each of said plurality of retrieved documents.

15. A method according to claim 14, further comprising the step of entering each of said cluster identifiers into said second database.

16. A method according to claim 12, further comprising the step of receiving, for each of said plurality of retrieved documents, a weight for each of at least some of said plurality of user-defined fields.

17. A method according to claim 16, further comprising the step of entering said weights into said second database.

18. A method according to claim 16, further comprising the step of tallying said weights for each of said plurality of retrieved documents.

19. A method according to claim 12, wherein step a) includes the step of presenting the user with a first input form for developing said set of search arguments.

20. A method according to claim 12, wherein step b) includes the step of presenting the user with a second input form for developing said set of user-defined fields.

21. A method according to claim 20, further comprising the step of receiving via said second input form answers to a plurality of questions relating to a business of the user.

22. A method according to claim 20, further comprising the step of receiving via said second input form weights for at least some of said answers.

23. A computer readable medium containing computer instructions for researching and analyzing information contained in a plurality of documents belonging to a first database, searchable on a plurality of search fields and having a corresponding plurality of search field values, the computer instructions comprising:
   a) a first set of instructions for receiving a set of search arguments relating to one or more interests of a user;
   b) a second set of instructions for receiving a set of user-defined fields relating to said one or more interests, said set of user-defined fields being distinct from said set of search arguments;
   c) a third set of instructions for searching the first database using at least some of said set of search arguments so as to retrieve a plurality of retrieved documents from the plurality of documents;
   d) a fourth set of instructions for receiving, for each of said plurality of retrieved documents, a user-defined field value for at least one user-defined field of said set of user-defined fields so as to receive a plurality of user-defined field values, said plurality of user-defined field values having been extracted from said plurality of retrieved documents;
   e) a fifth set of instructions for entering said plurality of user-defined values received in step d) into a second database;
   f) a sixth set of instructions for entering the plurality of search field values into said second database; and
   g) a seventh set of instructions for presenting a high level of abstraction (HLA) framework form to a user.

24. A computer readable medium according to claim 23, further comprising in addition to the third set of instructions, an eighth set of instructions for filtering said plurality of retrieved documents based on at least some of said set of search arguments so as to obtain a refined set of documents.

25. A computer readable medium according to claim 23, further comprising a ninth set of instructions receiving an HLA cluster identifier for each of said plurality of retrieved documents.

26. A computer readable medium according to claim 23, further comprising a tenth set of instructions for entering each of said HLA cluster identifiers into said second database.

27. A computer readable medium according to claim 23, further comprising an eleventh set of instructions for receiving, for each of said plurality of retrieved documents, a weight for each of at least some of said plurality of user-defined fields.

28. A computer readable medium according to claim 27, further comprising a twelfth set of instructions for entering said weights into said second database.

29. A computer readable medium according to claim 27, further comprising a thirteenth set of instructions for tallying said weights for each of said plurality of retrieved documents.

30. A computer readable medium according to claim 23, wherein said first set of instructions includes instructions for presenting the user with a first input form for developing said set of search arguments.

31. A computer readable medium according to claim 23, wherein said second set of instructions includes instructions for presenting the user with a second input form for developing said set of user-defined fields.

32. A computer readable medium according to claim 31, further comprising a fourteenth set of instructions for receiving via said second input form answers to a plurality of questions relating to a business of the user.

33. A computer readable medium according to claim 32, further comprising a fifteenth set of instructions for receiving via said second input form weights for at least some of said answers.

34. A system for researching and analyzing information contained in a plurality of documents belonging to a first database, searchable on a plurality of search fields and having a corresponding plurality of search field values, the system comprising:
   a) a computer;
   b) a second database;
   c) a first set of instructions executable by said computer for receiving a set of search arguments relating to one or more interests of a user;
   d) a second set of instructions executable by said computer for receiving a set of user-defined fields relating to said one or more interests, said set of user-defined fields being distinct from said set of search arguments;
   e) a third set of instructions executable by said computer for searching the first database using at least some of said set of search arguments so as to retrieve a plurality of retrieved documents from the plurality of documents;
   f) a fourth set of instructions executable by said computer for receiving, for each of said plurality of retrieved documents, a user-defined field value for at least one user-defined field of said set of user-defined fields so as to receive a plurality of user-defined field values, said plurality of user-defined field values having been extracted from said plurality of retrieved documents;
   g) a fifth set of instructions executable by said computer for entering said plurality of user-defined values received in step f) into said second database; and
   h) a sixth set of instructions executable by said computer for entering the plurality of search field values into said second database; and
   i) a seventh set of instructions for presenting a high level of abstraction (HLA) framework form to a user.

35. A system according to claim 34, wherein said second database is contained in said computer.

36. A system according to claim 34, further comprising in addition to the third set of instructions, an eighth set of instructions for filtering said plurality of retrieved documents based on at least some of said set of search arguments so as to obtain a refined set of documents.

37. A system according to claim 34, further comprising a ninth set of instructions receiving an HLA cluster identifier for each of said plurality of retrieved documents.

38. A system according to claim 37, further comprising a tenth set of instructions for entering each of said cluster identifiers into said second database.

39. A system according to claim 34, further comprising an eleventh set of instructions for receiving, for each of said plurality of retrieved documents, a weight for each of at least some of said plurality of user-defined fields.

40. A system according to claim 39, further comprising a twelfth set of instructions for entering said weights into said second database.

41. A system according to claim 39, further comprising a thirteenth set of instructions for tallying said weights for each of said plurality of retrieved documents.

42. A system according to claim 34, wherein said first set of instructions includes instructions for presenting the user with a first input form for developing said set of search arguments.

43. A system according to claim 34, wherein said second set of instructions includes instructions for presenting the user with a second input form for developing said set of user-defined fields.

* * * * *